Feb. 3, 1959  F. SMOLAŘ  2,872,177
CENTRIFUGALLY CONTROLLED GOVERNOR DEVICE, MORE
PARTICULARLY FOR MOTION PICTURE CAMERAS
Filed Sept. 5, 1957
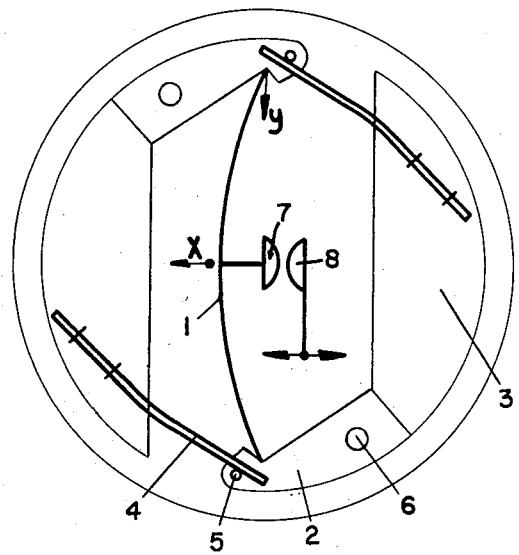
INVENTOR.
František Smolař
BY 2,872,177

CENTRIFUGALLY CONTROLLED GOVERNOR DEVICE, MORE PARTICULARLY FOR MOTION PICTURE CAMERAS

František Smolař, Modřany, Czechoslovakia, assignor to Meopta, narodni podnik, Modřany, Czechoslovakia Application September 5, 1957, Serial No. 682,102

Claims priority, application Czechoslovakia September 6, 1956

2 Claims. (Cl. 264—16)

The present invention relates to centrifugal contact governors, particularly for use in motion picture cameras, and it is an object of the invention to provide a governor which is improved over the designs known hitherto in such a way as to be adapted for varying the rotational speed controlled by the governor within the widest range possible.

In motion picture cameras driven by an electric motor, it is necessary that it be possible to vary the frame frequency and to maintain a steady frequency at any adjustment of the rotational speed of the motor with a contact breaker controlled by a centrifugal governor.

Electric contact governors are known for use with cinematograph apparatuses, and which permit the rotational speed to be adjusted, but merely within a very limited range determined by the square dependence of the centrifugal force of the weights of the governor on its rotational speed.

Furthermore, centrifugal friction governors have been designed for adjusting the controlled rotational speed within the widest range, but these governors are lacking in precision in the speed control and result in considerable loss of power. The present invention has as its object the adjustable control of the rotational speed within the widest range possible, and with the rotational speed adjusted at will within such range being accurately maintained.

A further purpose of the present invention is the achievement of a substantially linear interdependence between the rotational speed and the stroke of the regulating contact.

In accordance with the present invention the possibility of obtaining a fluent change of the rotational speed as well as the practically linear dependence of the rotational speed on the stroke of the regulating contact are brought about by interconnecting the governor weights by two springs, each of which is fixedly fastened to or encased in a related one of the weights and bears, at its other end, against an arm of the other weight.

The invention will be more clearly understood from the following description of an illustrative embodiment which is to be read with reference to the accompanying drawing showing an elevation view of a centrifugal governor according to the present invention.

Referring to the drawing in detail, it will be seen that the governor according to the present invention comprises a flat strut spring 1 clamped at its ends between arms 2 which are integral parts of centrifugal weights 3. The weights 3 are pivotally mounted, as at 6, so that centrifugal force acting on the weights 3 causes the latter to pivot in the directions moving the arms 2 toward each other, thereby deflecting spring 1 in the directions of the arrows x, y. This deflection constituting the regulation stroke corresponds to the respective rotational speed and controls the opening and closing of the contacts for controlling the supply of current to the motor. In order to permit control of the speed within wider limits, one of the contacts 7 is connected to the spring 1, while the other or regulation contact 8 is adjustable in the direction of the arrows (which are not provided with reference symbols in the accompanying drawing) so that its position corresponds to the desired rotational speed.

A disadvantage of the above described arrangement consists in that the deflection of the flat strut spring 1 is not linearly dependent on the centrifugal force and thereby on the rotational speed and, moreover, this arrangement permits only a small range of speed variation which is inadequate even to partially cover the range needed for varying the frame frequency of the camera.

In order to eliminate these disadvantages, the governor according to the present invention further comprises supplementary leaf springs 4.

Each of the leaf springs 4 has one end fixedly encased in a related one of the weights 3, while the other end of the leaf spring bears against a pin 5 projecting from the arm 2 of the other weight 3. When the rotational speed increases, the weights 3 are turned about their pivots 6, so that the springs 4 are bent or flexed and act, at their ends, against the pins 5 on arms 2 to resist the movement of the latter toward each other for deflecting the spring 1. By reason of the counterpressure of the springs 4, the force tending to deflect the spring 1 is reduced to a small residual value in equilibrium with the thrust of the flat strut spring 1. The range of such residual value of the forces acting on the weights 3 corresponds to the tension and stroke of the flat spring 1, so that the deflection of the spring 1 and the corresponding displacement of the movable contact 7 is a linear function of the rotational speed of the governor. By shifting the contact 8 in the direction of the stroke of the contact 7 a linear control of the rotational speed is achieved.

In addition to the features above described, the governor embodying the present invention presents the further advantage of having a minimum size so that it can be mounted in a small motor, without substantially increasing the overall dimensions of the motor.

Although an illustrative embodiment has been described in detail herein with reference to the accompanying drawing, it is to be noted that the invention is not limited to that particular embodiment, and that various changes and modifications may be effected therein without departing from the scope or spirit of the invention, except as defined in the appended claims.

What I claim is:

1. A centrifugal governor comprising a rotated member, a pair of weights pivotally mounted on said member at diametrically opposed locations to swing relative to said member in planes perpendicular to the axis of rotation of the rotated member, said weights having arm-like portions which move generally toward each other in response to outward swinging of said weights by centrifugal force, a strut spring interposed between said arm-like portions of the weights and being bowed in correspondence to the outward swinging of the weights, cooperating control members on said strut spring and said rotated member, respectively, so that the control member on said strut spring is moved relative to the other control member by bowing of said strut spring, and additional springs each connected, at one end, to a related one of said weights and acting, at its other end, against the arm-like portion of the other of said weights to urge the latter to swing in the direction opposed to the centrifugal force acting thereon, the forces applied by said additional springs increasing sufficiently with swinging of said weights by centrifugal force to provide linear interdependence between the extent of the bowing of said strut spring and the rotational speed of said rotated member.

2. A centrifugal governor as in claim 1; wherein each of said additional springs is a leaf spring which is fixedly anchored, at said one end, to said related weight, and which bears, in a generally radially outward direction with respect to the axis of rotation of said rotated member, against a pin carried by said arm-like portion of the other weight.

References Cited in the file of this patent

UNITED STATES PATENTS 1,061,921     Oustad  ---------------- May 13, 1913

FOREIGN PATENTS 705,983     France  ---------------- Mar. 23, 1931